United States Patent
Konijnendijk

(10) Patent No.: US 8,380,426 B2
(45) Date of Patent: Feb. 19, 2013

(54) SYSTEM AND METHOD FOR EVALUATION OF AN AUTOMOTIVE VEHICLE FORWARD COLLISION THREAT

(75) Inventor: Bjorn Konijnendijk, Torslanda (SE)

(73) Assignee: Volvo Car Corporation, Goeteborg (SE)

( * ) Notice: Subject to any disclaimer, the term of this patent is extended or adjusted under 35 U.S.C. 154(b) by 330 days.

(21) Appl. No.: 12/893,252

(22) Filed: Sep. 29, 2010

(65) Prior Publication Data

US 2011/0077864 A1 Mar. 31, 2011

(30) Foreign Application Priority Data

Sep. 29, 2009 (EP) .................................. 09171562

(51) Int. Cl.
- *G06F 17/10* (2006.01)
- *G06G 7/78* (2006.01)
- *G06G 1/16* (2006.01)

(52) U.S. Cl. ......................................... 701/301
(58) Field of Classification Search .................... 701/301
See application file for complete search history.

(56) References Cited

U.S. PATENT DOCUMENTS

| | | | |
|---|---|---|---|
| 6,226,389 B1 * | 5/2001 | Lemelson et al. ............ | 382/104 |
| 6,498,972 B1 * | 12/2002 | Rao et al. ........................ | 701/45 |
| 6,950,014 B2 * | 9/2005 | Rao et al. ....................... | 340/438 |
| 7,009,500 B2 * | 3/2006 | Rao et al. ....................... | 340/435 |
| 7,138,938 B1 * | 11/2006 | Prakah-Asante et al. ....... | 342/70 |
| 7,388,513 B2 * | 6/2008 | Kubo .............................. | 340/903 |
| 7,487,074 B2 * | 2/2009 | Ohtsu et al. ....................... | 703/8 |
| 7,782,179 B2 * | 8/2010 | Machii et al. .................. | 340/435 |
| 7,783,403 B2 * | 8/2010 | Breed ............................. | 701/45 |
| 8,179,281 B2 * | 5/2012 | Strauss ........................ | 340/903 |
| 8,200,420 B2 * | 6/2012 | Solyom et al. ................ | 701/301 |
| 2003/0154010 A1 * | 8/2003 | Rao et al. ......................... | 701/45 |
| 2007/0150196 A1 * | 6/2007 | Grimm ........................ | 701/301 |
| 2009/0143951 A1 * | 6/2009 | Takahashi et al. .............. | 701/70 |
| 2009/0167560 A1 * | 7/2009 | Becker .......................... | 340/903 |
| 2009/0192710 A1 * | 7/2009 | Eidehall et al. ............... | 701/301 |
| 2010/0030430 A1 * | 2/2010 | Hayakawa et al. ............. | 701/42 |

* cited by examiner

*Primary Examiner* — Khoi Tran
*Assistant Examiner* — Harry Oh
(74) *Attorney, Agent, or Firm* — Brooks Kushman P.C.

(57) ABSTRACT

A method and system operable for evaluation of an automotive vehicle forward collision threat. The presence of an oncoming vehicle in front of a host vehicle is established and a passing position of the host vehicle for the moment when the vehicles reach each other is predicted. In addition, a free passing distance for free passing of the oncoming vehicle on a first side of the host vehicle is predicted for the situation when the host vehicle is positioned in the passing position. The free passing distance is the minimum distance between the first side of the host vehicle and a road edge. A width of the oncoming vehicle is also estimated. If the free passing distance is equal to or less than a comparison value, it is decided that a forward vehicle collision threat exists. The comparison value is at least equal to the width of the oncoming vehicle.

20 Claims, 4 Drawing Sheets

SYSTEM AND METHOD FOR EVALUATION OF AN AUTOMOTIVE VEHICLE FORWARD COLLISION THREAT

CROSS-REFERENCE TO RELATED APPLICATIONS

This application claims foreign priority benefits under 35 U.S.C. §119(a)-(d) to EP 09171562.3, filed Sep. 29, 2009, which is hereby incorporated by reference in its entirety.

TECHNICAL FIELD

The present invention relates to a method for evaluation of an automotive vehicle forward collision threat.

BACKGROUND

A current trend in the automotive industry is to introduce active safety systems for avoiding or mitigating collisions. Some of the introduced active safety systems are aimed at avoiding or mitigating forward collisions between a vehicle hosting such a system and an oncoming vehicle. These active safety systems have a potentially large positive impact on accident statistics. Forward collisions between two vehicles may, for example, be due to intentional or unintentional lane changes or to the fact that any of the drivers of the vehicles does not drive completely on the correct side of a road.

In known active safety systems for avoiding or mitigating a forward collision between a host vehicle and an oncoming vehicle, a vehicle forward collision threat evaluation system performs an evaluation of the vehicle forward collision threat before any action in order to avoid or mitigate a collision is executed. Normally, the vehicle forward collision threat evaluation systems utilize one or more sensors based on technologies such as RADAR (RAdio Detection And Ranging), LIDAR (Light Detection And Ranging), LASER (Light Amplification by Stimulated Emission of Radiation) and cameras in order to establish the presence of an oncoming vehicle and estimate parameters such as the distance between the oncoming vehicle and the host vehicle, lateral and longitudinal velocity of the oncoming vehicle, and lateral and longitudinal acceleration of the oncoming vehicle.

Typically, the estimated parameters are utilized for prediction of a future path of the oncoming vehicle. The predicted future path of the oncoming vehicle is then compared with a predicted future path of the host vehicle in order to check if a collision between the host vehicle and the oncoming vehicle is likely to occur, i.e. in order to decide whether there is a vehicle forward collision threat or not. In case it is decided that a vehicle forward collision threat exists, a collision avoidance functionality may be executed by the active safety system. For example, a Forward Collision Warning (FCW) functionality, a Collision Mitigation by Braking (CMbB) or an autonomous steering intervention of the host vehicle may then be executed.

Forward Collision Warning (FCW) is a function that warns the driver in case a collision with a target object seems likely. Collision Mitigation by Braking (CMbB) is a function that automatically applies braking in case a collision with a target object is unavoidable.

However, the above mentioned sensors, which are utilized in order to establish the presence of an oncoming vehicle and to estimate the above mentioned parameters thereof, provide estimations of the lateral velocity and the lateral acceleration of the oncoming vehicle with limited accuracy. This implies in turn that the accuracy of the predicted future path of the oncoming vehicle also is limited since the prediction of the future path is based on the lateral velocity and lateral acceleration (as well as other parameters) estimated by means of any of those sensors.

Furthermore, in order for an action executed in order to avoid a collision, e.g. an FCW, CMbB or autonomous steering intervention, to be effective, it has to be initiated a few seconds (e.g. about three seconds) before an estimated collision time point (or passing time point). Thus, the above mentioned vehicle forward collision threat evaluation has to be performed a few seconds before an estimated collision time point. Thereby, the future path of the oncoming vehicle, which is utilized for comparison with the path of the host vehicle in the evaluation, has to be predicted a few seconds before an estimated collision time point. However, there is an uncertainty of future maneuvers of the oncoming car, i.e. many things can happen during the time between the time point of prediction of the future path of the oncoming vehicle and the time point when the vehicles reach each other, resulting in another actual path of the oncoming vehicle than the predicted path.

Thus, since the predicted future path of the oncoming vehicle has limited accuracy and since there is an uncertainty of future movements of the oncoming vehicle in accordance with the above, the conventional vehicle forward collision threat evaluation, which is based on a comparison of the predicted future path of the oncoming vehicle and the predicted future path of the host vehicle, may easily turn out wrong. For example, it may result in false alarms and interventions. Consequently, there is still a need for another improved approach in automotive forward collision threat evaluations.

SUMMARY

One object of the invention is to provide an improved method for evaluation of an automotive vehicle forward collision threat.

One object of the present invention is achieved by:
  establishing the presence of an oncoming vehicle in front of a host vehicle, the host vehicle and the oncoming vehicle traveling on a road, and the oncoming vehicle being intended to pass the host vehicle on a first side of the host vehicle;
  estimating a longitudinal velocity of the oncoming vehicle;
  estimating a longitudinal distance between the host vehicle and the oncoming vehicle;
  determining a longitudinal velocity and a lateral velocity of the host vehicle and predicting a future path of the host vehicle;
  predicting a passing position of the host vehicle on the road for the moment when the host vehicle and the oncoming vehicle reach each other, whereby the prediction is based on the longitudinal velocity of the oncoming vehicle, the longitudinal distance, the longitudinal and lateral velocity of the host vehicle and the future path of the host vehicle;
  predicting a free passing distance for free passing of the oncoming vehicle on the first side of the host vehicle on the road, whereby the free passing distance is predicted for the situation when the host vehicle is positioned in the passing position, whereby the free passing distance is the minimum distance between the first side of the host vehicle and a road edge intended to be located on an opposite side of the oncoming vehicle compared to the host vehicle when the vehicles reach each other;

estimating a maximum transverse width of the oncoming vehicle;

deciding that a vehicle forward collision threat exists if the free passing distance is equal to or less than a comparison value, whereby the comparison value is at least equal to the estimated maximum transverse width of the oncoming vehicle, and deciding that no vehicle forward collision threat exists if the free passing distance is greater than the comparison value, and upon deciding that a vehicle forward collision threat exists, signaling the decision to a collision avoidance task execution system.

One method of the present invention is to provide a method which results in a more reliable vehicle forward collision threat evaluation.

One object of the present invention is to provide an improved automotive vehicle forward collision threat evaluation system.

One object of the present invention is achieved by:

means for establishing the presence of an oncoming vehicle traveling on a road in front of a vehicle hosting the system and traveling on the road, the oncoming vehicle being intended to pass the host vehicle on a first side of the host vehicle;

means for estimating a longitudinal velocity of the oncoming vehicle;

means for estimating a longitudinal distance between the host vehicle and the oncoming vehicle;

means for determining a longitudinal velocity and a lateral velocity of the host vehicle and predicting a future path of the host vehicle;

means for predicting a passing position of the host vehicle on the road for the moment when the host vehicle and the oncoming vehicle reach each other, whereby the means for predicting a passing position are arranged to base the prediction on the longitudinal velocity of the oncoming vehicle, the longitudinal distance, the longitudinal and lateral velocity of the host vehicle and the future path of the host vehicle;

means for predicting a free passing distance for free passing of the oncoming vehicle on the first side of the host vehicle on the road, whereby the means for predicting a free passing distance are arranged for predicting the free passing distance for the situation when the host vehicle is positioned in the passing position, whereby the free passing distance is the minimum distance between the first side of the host vehicle and a road edge intended to be located on an opposite side of the oncoming vehicle compared to the host vehicle when the vehicles reach each other;

means for estimating a maximum transverse width of the oncoming vehicle;

means for deciding whether a vehicle forward collision threat exists or not, whereby the decision means are arranged to decide that a vehicle forward collision threat exists if the free passing distance is equal to or less than a comparison value, whereby the comparison value is at least equal to the estimated maximum transverse width of the oncoming vehicle, and to decide that no vehicle forward collision threat exists if the free passing distance is greater than the comparison value, and means for signaling to a collision avoidance task execution system, whereby the signaling means are arranged to signal a decision of the existence of a vehicle forward collision threat to the execution system.

One object of the present invention is to provide a vehicle forward collision threat evaluation system which renders more reliable vehicle forward collision threat evaluations.

BRIEF DESCRIPTION OF THE DRAWINGS

In the following, the invention will be described in greater detail by way of example only with reference to attached drawings, in which.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As mentioned above, the present invention relates to an automotive vehicle forward collision threat evaluation system. In addition, the present invention relates to a method for evaluation of an automotive vehicle forward collision threat.

Figure 1:
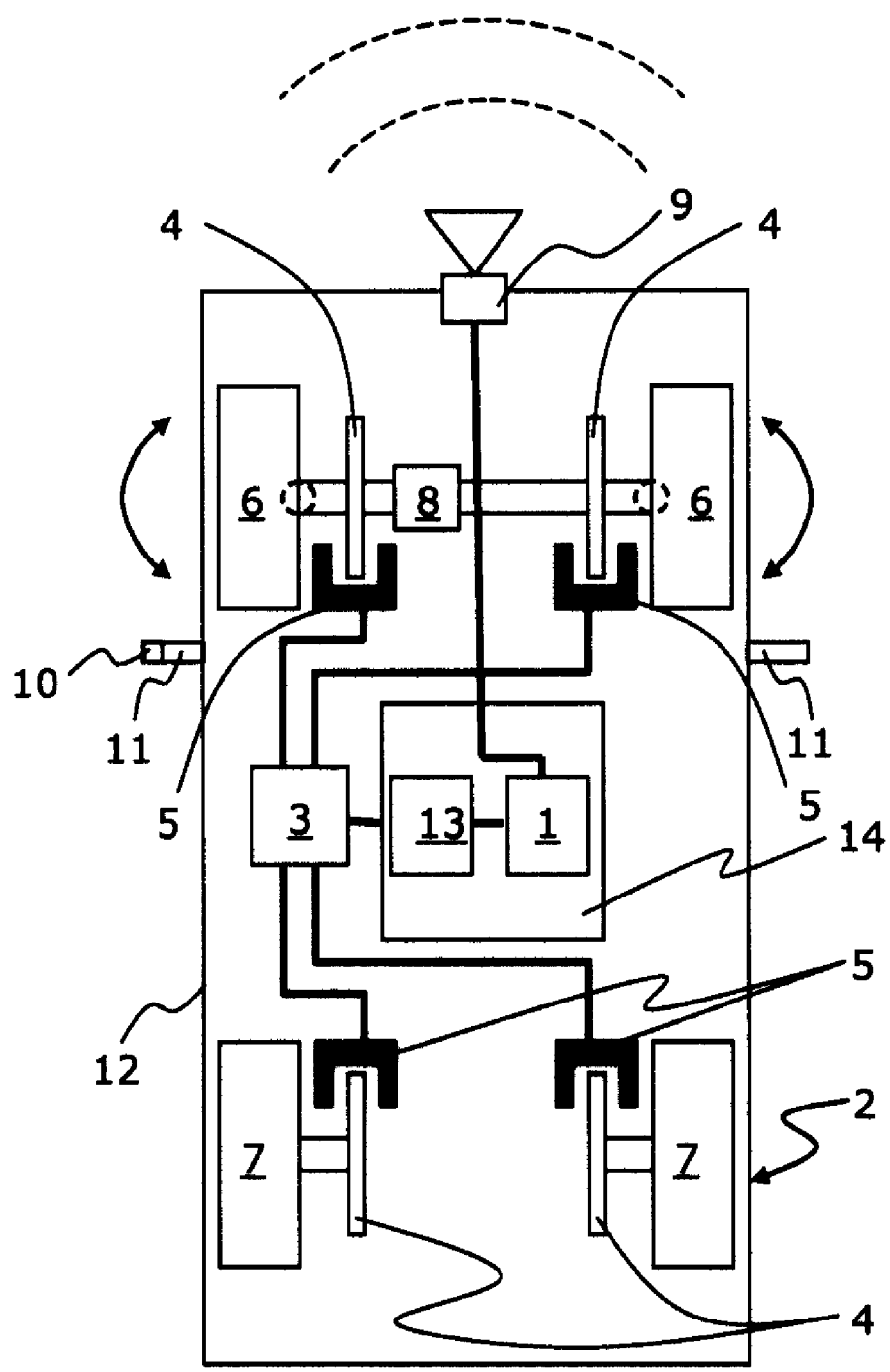
FIG. 1 is a schematic illustration of an automotive vehicle forward collision threat evaluation system according to the invention, whereby the system is arranged in a host vehicle.

FIG. 1 illustrates schematically a vehicle forward collision threat evaluation system 1 in accordance with the present invention. The evaluation system 1 is arranged in a host vehicle 2, i.e. a vehicle hosting the evaluation system 1. The host vehicle 2 has a braking system 3 such as an Antilock Brake System (ABS system), e.g. with brake discs 4 and appertaining calipers 5 associated with each of the front wheels 6 and rear wheels 7 of the host vehicle 2. The host vehicle 2 further usually has a power steering system 8, which is arranged to control the steering angle of the front wheels 6.

The evaluation system 1 comprises a front sensor 9, such as a radar, a lidar, a laser or a camera based sensor mounted at the front end of the host vehicle 2 and arranged to monitor the region in front of the host vehicle 2. In FIG. 1, the evaluation system 1 comprises one front sensor 9. However, the evaluation system 1 may alternatively comprise more than one front sensor. The front sensors may then be of the same or different types. In addition, the evaluation system 1 comprises a lane marker sensor 10 mounted on a side mirror 11 at a first side 12 of the host vehicle 2. The lane marker sensor 10 could alternatively, however, be mounted to any other suitable part of the first side 12 of the host vehicle 2. In addition, the evaluation system 1 may comprise more than one lane marker sensor 10. In FIG. 1, the connection between the lane marker sensor 10 and the evaluation system 1 is omitted for clarification purposes.

Furthermore, the evaluation system 1 is connected to a collision avoidance task execution system 13, and the evaluation system 1 and the execution system 13 are comprised in an active safety system 14. In FIG. 1, the evaluation system 1 and the execution system 13 are shown as separate units, but they may instead be integrated in the same unit. The evaluation system 1 is arranged to evaluate a vehicle forward collision threat and, if it is decided that a vehicle forward collision threat exists, signal the decision to the execution system 13. Based on the decision of the evaluation system 1 that a forward collision threat exists and possibly based on one or more further decision algorithms, the execution system 13 may provide for the execution of a collision avoidance task of the active safety system 14.

In FIG. 1, the active safety system 14 is operatively connected with the braking system 3 of the host vehicle 2. Thus, the active safety system 14 shown in FIG. 1 may, for example, be an active safety system of the type Forward Collision Avoidance System (FCAS). For example, the active safety system 14 shown in FIG. 1 may be arranged to execute a Forward Collision Warning (FCW) functionality and/or a Collision Mitigation by Braking (CMbB) upon determination that a collision avoidance task is to be executed.

However, the active safety system 14 comprising the evaluation system 1 according to the invention may instead of, or additionally to, being operatively connected with the braking system 3 of the host vehicle 2, be operatively connected with the steering system 8, a stability system (not shown) or, for example, the active safety system 14 may then be arranged to execute a Forward Collision Warning (FCW) functionality, a Collision Mitigation by Braking (CMbB), an autonomous steering intervention of the host vehicle 2 and/or any other suitable intervention when it is decided that a collision avoidance task is to be executed. In addition, the active safety system 14 may comprise any further suitable units or systems than those shown in FIG. 1.

As mentioned above, conventional vehicle forward collision threat evaluations are based on comparisons of a predicted future path of the host vehicle 2 and a predicted future path of an oncoming vehicle. However, the predicted future path of the oncoming vehicle utilized in the conventional evaluation methods has limited accuracy. This is due to the fact that the sensors, which are utilized in order to estimate parameters of the oncoming vehicle for prediction of the future path of the oncoming vehicle, provide estimations of the lateral velocity and the lateral acceleration of the oncoming vehicle with limited accuracy. Since the prediction of the future path of the oncoming vehicle is based on the lateral velocity and lateral acceleration (as well as other parameters) estimated by means of any of those sensors, the accuracy of the predicted future path of the oncoming vehicle is also limited.

In addition, since any collision avoidance tasks have to be initiated a few seconds (e.g. about three seconds) before the host vehicle 2 and the oncoming vehicle reach each other in order to be effective, the conventional comparisons are performed based on a path of the oncoming vehicle which is predicted a few seconds before the vehicles reach each other. During the time between the time point of prediction of the future path of the oncoming vehicle and the time point when the vehicles reach each other, many things can happen resulting in another actual path of the oncoming vehicle than the predicted path.

For example, the case where it is decided that a collision threat exists based on the predicted future path of the oncoming vehicle, but where the oncoming vehicle is steered away from the predicted path after the time point of predicting the path, may result in an unnecessary or false collision avoidance action. A false collision avoidance action may be very annoying for the driver or even dangerous.

Thus, since conventional vehicle forward collision threat evaluations utilize a predicted future path of the oncoming vehicle having limited accuracy and since there is an uncertainty in future maneuvers of the oncoming vehicle, the conventional vehicle forward collision threat evaluations may easily turn out wrong. Consequently, there is a need for another approach in vehicle forward collision threat evaluations.

The solution in accordance with one non-limiting aspect of the present invention is based on the fact that, instead of examining the relative paths of the host vehicle 2 and the oncoming vehicle, the situation caused by the host vehicle 2 only is examined (i.e. optionally, a predicted path of the oncoming vehicle may not be utilized). In addition, the solution is based on the assumption that it lies in the interest of the oncoming car to avoid a collision.

More specifically, the solution in accordance with one non-limiting aspect of the present invention is based on estimation of a passing position of the host vehicle 2 on the road for the moment when the host vehicle 2 and the oncoming vehicle reach each other and on the assumption that if there is enough space left on the road (or in a lane) for the oncoming vehicle to safely pass the host vehicle 2 on the correct side when the host vehicle 2 is positioned in the passing position, the oncoming vehicle will use this space in order to avoid a collision. If there is not enough space left, a vehicle forward collision threat exists.

Figure 2:
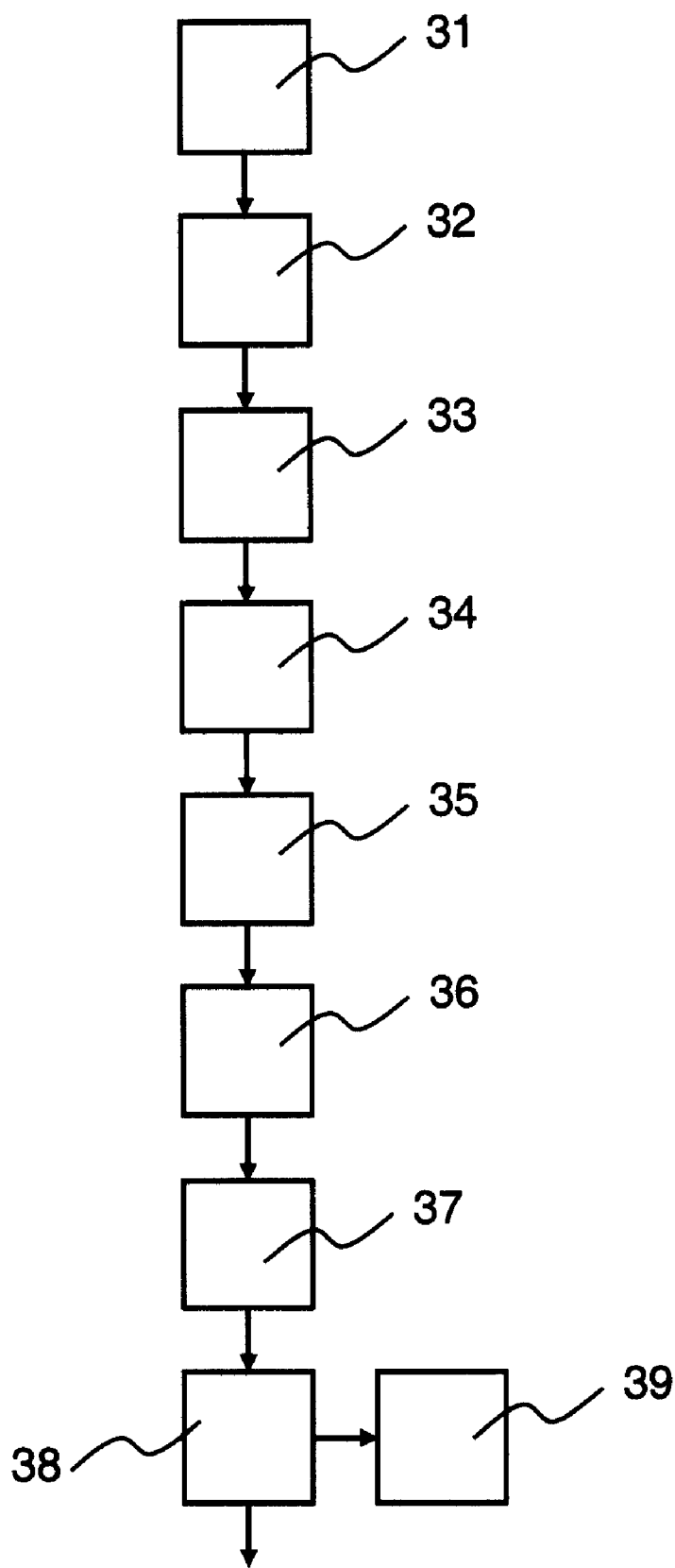
FIG. 2 is a schematic flowchart of the steps of the method for evaluation of an automotive vehicle forward collision threat according to the invention.
Figure 3:
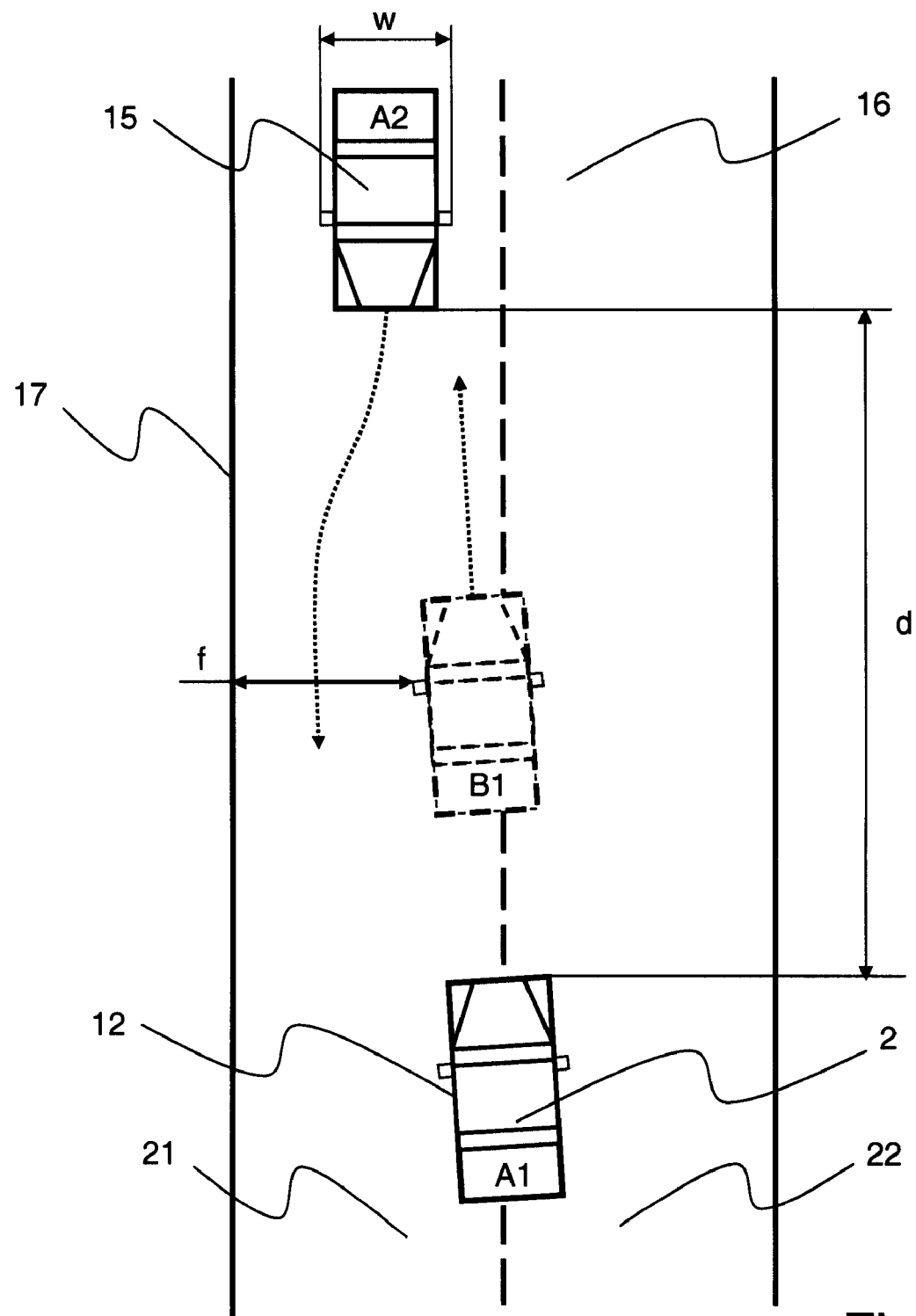
FIG. 3 illustrates schematically a situation in which it is decided that no forward vehicle collision threat exists according to the invention.
Figure 4:
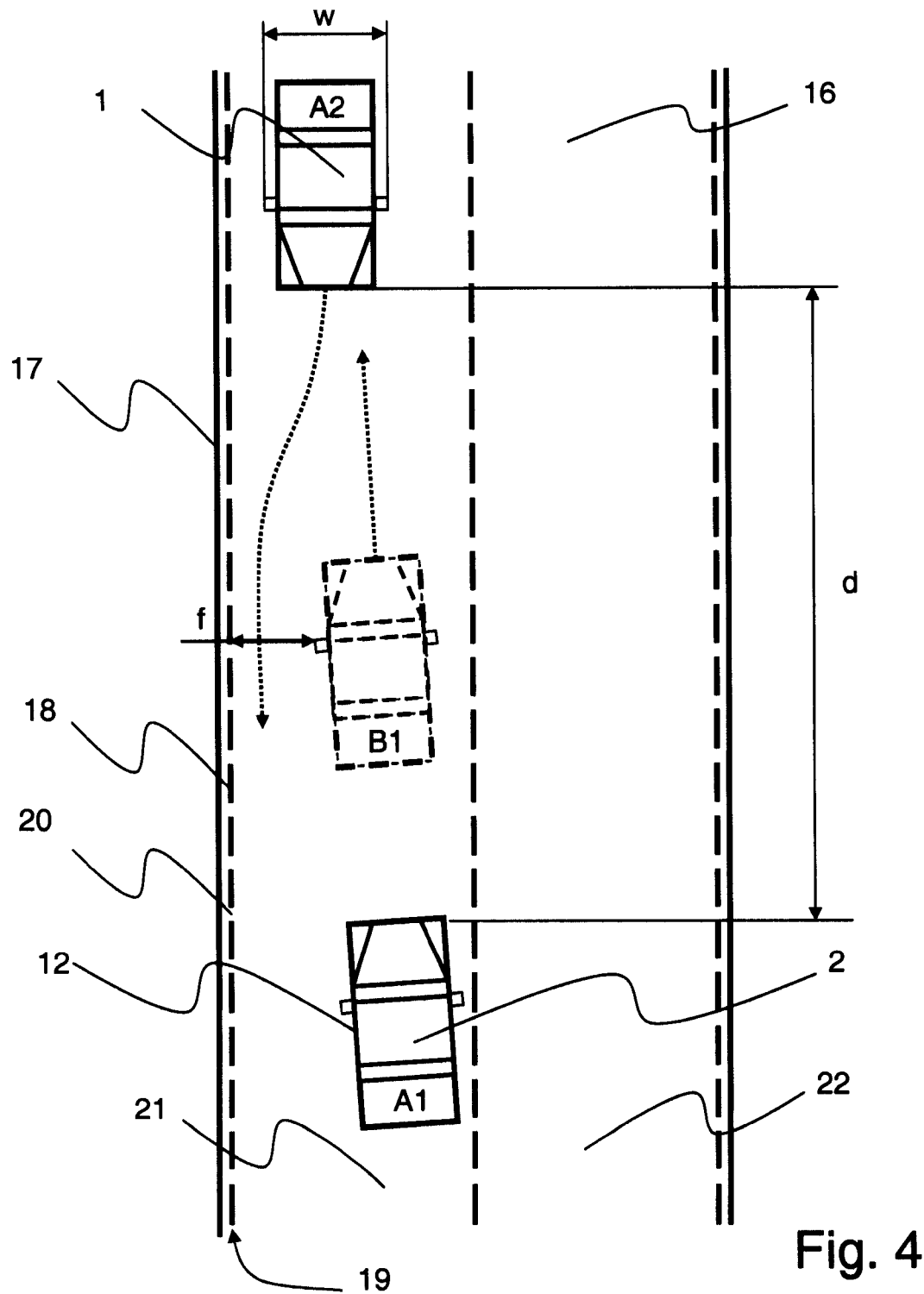
FIG. 4 illustrates schematically a situation in which it is decided that a forward vehicle collision threat exists according to the invention.

The method for evaluation of an automotive vehicle forward collision threat according to the invention will now be described in greater detail with reference to FIGS. 2-4. The method according to the invention is performed in a host vehicle 2. In a first step 31 of the method, the presence of an oncoming vehicle 15 in front of the host vehicle 2 is established, whereby the host vehicle 2 and the oncoming vehicle 15 are traveling on a road 16. The road 16 shown in FIGS. 3-4 comprises a first lane 21 and a second lane 22, whereby the oncoming vehicle 15 is intended to travel in the first lane 21 and the host vehicle 2 is intended to travel in the second lane 22. However, the method is also applicable in case the host vehicle 2 and the oncoming vehicle 15 travel on a road which comprises one lane only, i.e. a road on which the host vehicle 2 and the oncoming vehicle 15 normally are intended to pass each other in the same lane (not shown) and the method is also applicable in the case the host vehicle 2 and the other vehicle 15 travel on a road in the same direction. Examples of the positions of the host vehicle 2 and the oncoming vehicle 15 upon detection of the oncoming vehicle 15 are shown in FIGS. 3-4 at A1 and A2, respectively. The oncoming vehicle 15 is intended to pass the host vehicle 2 on the first side 12 of the host vehicle 2, i.e. in order for the oncoming vehicle 15 to pass the host vehicle 2 on the correct side it has to pass the host vehicle 2 on the first side 12 of the host vehicle 2 (FIGS. 3-4). The presence of the oncoming vehicle 15 is established by means of one or more front sensors 9, such as radar, lidar, laser or camera based sensors (FIG. 1).

In a second step 32 the longitudinal velocity of the oncoming vehicle 15 is estimated. In a third step 33 a longitudinal distance d (FIGS. 3-4) between the host vehicle 2 and the oncoming vehicle 15 is estimated. One or more front sensors 9 may be utilized for the estimation of the longitudinal velocity of the oncoming vehicle 15 and for the estimation of the longitudinal distance d. In a fourth step 34 a longitudinal velocity and a lateral velocity of the host vehicle 2 are determined and a future path of the host vehicle 2 is predicted.

In a fifth step 35, a passing position of the host vehicle 2 on the road 16 for the moment when the host vehicle 2 and the oncoming vehicle 15 reach each other is predicted. In FIGS. 3-4, the passing position of the host vehicle 2 is indicated at B. The prediction of the passing position is based on straightforward calculations utilizing the longitudinal velocity of the oncoming vehicle 15 estimated in the second step 32, the longitudinal distance d between the host vehicle 2 and the oncoming vehicle 15 estimated in the third step 33, the longitudinal velocity and the lateral velocity of the host vehicle 2 determined in the fourth step 34 and the future path of the host vehicle 2 predicted in the fourth step 34.

In a sixth step 36 a free passing distance f for free passing of the oncoming vehicle 15 on the first side 12 of the host vehicle 2 on the road 16 is predicted. The free passing distance f is predicted for the situation when the host vehicle 2 is positioned in the passing position predicted in the fifth step 35 (indicated at B in FIGS. 3-4). As shown in FIG. 3, the free passing distance f is the minimum distance between the first side 12 of the host vehicle 2 and a road edge 17 of the road 16 intended to be located on an opposite side of the oncoming vehicle 15 compared to the host vehicle 2 when the vehicles 2, 15 reach each other.

One or more lane marker sensors 10 (FIG. 1) may be utilized for predicting the minimum distance (i.e. the free passing distance f) between the first side 12 of the host vehicle 2 and the road edge 17. Lane marker sensors 10 provide a good detection of lane markers 18. However, lane marker sensors 10 provide also a good detection of the road edge 17 by providing a good detection of the boundary between the road 16 and a sidewalk, i.e. the curb (not shown).

Alternatively, the free passing distance f may be approximated to be the minimum distance between the first side 12 of the host vehicle 2 and a lane border 19 intended to be located on an opposite side of the oncoming vehicle 15 compared to the host vehicle 2 when the vehicles 2, 15 reach each other, as shown in FIG. 4. The lane border 19 shown in FIG. 4 is constituted by a plurality of lane markers 18 and intermediate spaces 20. However, the lane border 19 may alternatively be constituted by one lane marker only (i.e. a continuous line). One or more lane marker sensors 10 (FIG. 1) may be utilized for predicting the minimum distance between the first side 12 of the host vehicle 2 and the lane border 19.

As shown in FIG. 4, the lane border 19 utilized in approximation of the free passing distance f may constitute an outer lane border of a first lane 21 on the road 16, in which first lane 21 the oncoming vehicle 15 is intended to travel. The road 16 shown in FIG. 4 comprises further a second lane 22, in which the host vehicle 2 is intended to travel. However, the lane border 19 utilized in approximation of the free passing distance f may likewise constitute an outer lane border on a road which comprises one lane only, i.e. a road on which the host vehicle 2 and the oncoming vehicle 15 normally are intended to pass each other in the same lane (not shown).

Thus, the prediction of the free passing distance f may be performed by predicting the minimum distance between the first side 12 of the host vehicle 2 and the road edge 17 or between the first side 12 of the host vehicle 2 and the lane border 19 for the situation when the host vehicle 2 is positioned in the passing position. Thereby, the free passing distance f is an estimation of the space left on the road 16 for the oncoming vehicle 15 to safely pass the host vehicle 2 without colliding with the host vehicle 2 and without being forced off the road 16. In case the free passing distance f is approximated to be the minimum distance between the first side 12 of the host vehicle 2 and the lane border 19, the free passing distance f constitutes also an estimation of the space left in the lane, in which the oncoming vehicle 15 travels, for the oncoming vehicle 15 to safely pass the host vehicle 2 without colliding with the host vehicle 2 and without being forced out of the lane.

In a seventh step 37, a maximum transverse width w of the oncoming vehicle 15 is estimated. The maximum transverse width w of the oncoming vehicle 15 may be estimated by estimating a vehicle size class of the oncoming vehicle 15. The maximum transverse width w of the oncoming vehicle 15 may be estimated to be a pre-set standard maximum transverse width of vehicles of the estimated vehicle size class. Still alternatively, the maximum transverse width w may be estimated to be a pre-set value, i.e. a pre-set value may be utilized as the maximum transverse width w of all oncoming vehicles.

In an eighth step 38 it is decided whether a vehicle forward collision threat exists or not. Then it is decided that a vehicle forward collision threat exists if the free passing distance f is less than a comparison value. The comparison value may be tuned differently depending on the area of application. However, it is at least equal to the estimated maximum transverse width w of the oncoming vehicle 15. Thus, the comparison value may be set to be the estimated maximum transverse width w. Alternatively, it may be set to be a certain percentage greater than the estimated maximum transverse width w. Furthermore, it is decided that no vehicle forward collision threat exists if the free passing distance f is greater than the comparison value.

Upon deciding that a vehicle forward collision threat exists, the decision is signalled to the collision avoidance task execution system 13 (FIG. 1) in a ninth step 39. Based on the signalled decision that a collision threat exists, and possibly based on one or more further decision algorithms, the execution system 13 may then provide for the execution of one or more collision avoidance tasks of the active safety system 14.

For example, the executed collision avoidance task may be a Forward Collision Warning (FCW), a Collision Mitigation by Braking (CMbB) or an autonomous steering intervention of the host vehicle 2.

Thus, the method according to the invention provides another improved approach of vehicle forward collision threat evaluations compared to the conventional methods. In the method according to the invention, the vehicle forward collision threat evaluation may be performed without using any predicted future path for the oncoming vehicle 15 and without using any lateral velocity or lateral acceleration of the oncoming vehicle 15. Instead the vehicle forward collision threat evaluation is based on prediction of a free passing distance f for free passing of the oncoming vehicle 15 on the correct side of the host vehicle 2. The free passing distance f is compared with the maximum transverse width w of the oncoming vehicle 15 in order to decide if there is enough space left on the road 16 for the oncoming vehicle 15 to safely pass the host vehicle 2 without colliding with the host vehicle 2 and without being forced off the road 16.

If it is determined that there is enough space left on the road 16 for the oncoming vehicle 15 to safely pass the host vehicle 2, it is assumed that the oncoming vehicle 15 will use this space in order to avoid a collision. Thus, no collision avoidance task is executed then. FIG. 3 shows one example of a situation when it is decided that no vehicle forward collision threat exists according to the method according to the invention. However, if it is determined that there is not enough space left on the road 16 for the oncoming vehicle 15 to safely pass the host vehicle 2, a collision avoidance task may be executed. FIG. 4 shows one example of a situation when it is decided that a vehicle forward collision threat exists according to the method according to the invention. However, before the execution of the collision avoidance task, further decision algorithms may optionally be employed.

An advantage with the method according to the present invention, compared to conventional methods, is that it will lead to a more reliable evaluation of a vehicle forward collision threat. This is due to the fact that an uncertain predicted path for the oncoming vehicle 15 is not utilized for the evaluation as in the conventional methods. The more reliable evaluation will lead to the execution of fewer false or unnecessary collision avoidance tasks. In the end, it could be the difference between being able to reach an acceptable level of false alarms or not. Furthermore, when it is determined that there is a vehicle forward collision threat, the confidence that there is a real threat is higher. Thus, the positive performance may also be increased, which in this case means earlier interventions and higher safety benefits of the evaluation system.

Thus, in accordance with the present invention is provided an automotive vehicle forward collision evaluation system 1 having means for establishing the presence of an oncoming vehicle 15 traveling on a road 16 in front of a vehicle 2 hosting the system 1 and traveling on the road 16. The oncoming vehicle 15 is intended to pass the host vehicle 2 on a first side 12 of the host vehicle 2. Means are provided for estimating a longitudinal velocity of the oncoming vehicle 15. Further means are provided for estimating a longitudinal distance (d) between the host vehicle 2 and the oncoming vehicle 15. In addition means for determining a longitudinal velocity and a lateral velocity of the host vehicle 2 and predicting a future path of the host vehicle 2 are provided as well as means for predicting a passing position of the host vehicle 2 on the road 16 for the moment when the host vehicle 2 and the oncoming vehicle 15 reach each other. The means for predicting a passing position are arranged to base the prediction on the longitudinal velocity of the oncoming vehicle 15, the longitudinal distance, the longitudinal and lateral velocity of the host vehicle 2 and the future path of the host vehicle 2.

Furthermore, means for predicting a free passing distance f for free passing of the oncoming vehicle 15 on the first side 12 of the host vehicle 2 on the road 16 are provided. The means for predicting a free passing distance are arranged for predicting the free passing distance for the situation when the host vehicle 2 is positioned in the passing position. The free passing distance f is the minimum distance between the first side 12 of the host vehicle 2 and a road edge 17 intended to be located on an opposite side of the oncoming vehicle 15 compared to the host vehicle 2 when the vehicles 2, 15 reach each other. Alternatively, the free passing distance f may be approximated to be the minimum distance between the first side 12 of the host vehicle 2 and a lane border 19 intended to be located on an opposite side of the oncoming vehicle 15 compared to the host vehicle 2 when the vehicles 2, 15 reach each other.

Means are also provided for estimating a maximum transverse width w of the oncoming vehicle 15. In addition, means for deciding whether a vehicle forward collision threat exists or not are provided. The decision means are arranged to decide that a vehicle forward collision threat exists if the free passing distance f is equal to or less than a comparison value, whereby the comparison value is at least equal to the estimated maximum transverse width w of the oncoming vehicle 15, and to decide that no vehicle forward collision threat exists if the free passing distance f is greater than the comparison value. In addition, means for signaling to a collision avoidance task execution system 13 are provided. The signaling means are arranged to signal a decision of the existence of a vehicle forward collision threat to the execution system 13.

The means for establishing the presence of an oncoming vehicle 15 may comprise one or more front sensor 9 selected from the group of: radar, lidar, laser or camera based sensors.

The means for predicting a free passing distance f may comprise one or more lane marker sensors 10.

The means for estimating a maximum transverse width w of the oncoming vehicle 15 may comprise a task execution system 13, an active safety system 14, RADAR, LIDAR, LASER, cameras, etc. Alternatively, the means for estimating a maximum transverse width w of the oncoming vehicle 15 may comprise means for estimating a vehicle size class of the oncoming vehicle 15, whereby the means for estimating a maximum transverse width w of the oncoming vehicle 15 are arranged to estimate the maximum transverse width w of the oncoming vehicle 15 to be a pre-set standard maximum transverse width of vehicles of an estimated vehicle size class of the oncoming vehicle 15. Still alternatively, the means for estimating a maximum transverse width w of the oncoming vehicle 15 may comprise means which are arranged to estimate the maximum transverse width w to be a pre-set value.

The present invention also relates to an automotive vehicle 2 comprising an automotive vehicle forward collision evaluation system 1 as described above.

The invention is not limited to the above-described embodiments, but may be varied within the scope of the following claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for evaluation of an automotive vehicle forward collision threat comprising:

establishing, by a front sensor system, a presence of an oncoming vehicle in front of a host vehicle, said host vehicle and said oncoming vehicle traveling on a road, and said oncoming vehicle being intended to pass said host vehicle on a first side of said host vehicle;

estimating a longitudinal velocity of said oncoming vehicle;

estimating a longitudinal distance (d) between said host vehicle and said oncoming vehicle;

determining a longitudinal velocity and a lateral velocity of said host vehicle and predicting a future path of said host vehicle;

predicting a passing position of said host vehicle on said road for the moment when said host vehicle and said oncoming vehicle reach each other, whereby the prediction is based on said longitudinal velocity of said oncoming vehicle, said longitudinal distance, said longitudinal and lateral velocity of said host vehicle and said future path of said host vehicle;

predicting a free passing distance (f) for free passing of said oncoming vehicle on said first side of said host vehicle on said road, whereby said free passing distance is predicted for the situation when said host vehicle is positioned in said passing position, whereby said free passing distance (f) is the minimum distance between said first side of said host vehicle and a road edge intended to be located on an opposite side of said oncoming vehicle compared to said host vehicle when said vehicles reach each other;

estimating a maximum transverse width (w) of said oncoming vehicle;

deciding that a vehicle forward collision threat exists if said free passing distance (f) is equal to or less than a comparison value, whereby said comparison value is at least equal to said estimated maximum transverse width (w) of said oncoming vehicle, and deciding that no vehicle forward collision threat exists if said free passing distance (f) is greater than said comparison value, and upon deciding that said vehicle forward collision threat exists, signaling the decision to a collision avoidance task execution system.

2. The method according to claim 1, wherein the front sensor system comprises at least one of a radar, a lidar, a laser and a camera based sensor.

3. The method according to claim 1 wherein said free passing distance (f) is approximated to be the minimum distance between said first side of said host vehicle and a lane border intended to be located on an opposite side of said oncoming vehicle compared to said host vehicle when said vehicles reach each other.

4. The method according to claim 1 wherein said free passing distance (f) is predicted by utilization of a lane marker sensor.

5. The method according to claim 1 further comprising estimating a vehicle size class of said oncoming vehicle, whereby said maximum transverse width (w) of said oncoming vehicle is estimated to be a pre-set standard maximum transverse width (w) of vehicles of said estimated vehicle size class.

6. The method according to claim 1 wherein said maximum transverse width (w) is estimated to be a pre-set value.

7. An automotive vehicle forward collision threat evaluation system comprising:

means for establishing the presence of an oncoming vehicle traveling on a road in front of a vehicle hosting said system and traveling on said road (16), said oncoming vehicle being intended to pass said host vehicle on a first side of said host vehicle;

means for estimating a longitudinal velocity of said oncoming vehicle;

means for estimating a longitudinal distance (d) between said host vehicle and said oncoming vehicle;

means for determining a longitudinal velocity and a lateral velocity of said host vehicle and predicting a future path of said host vehicle;

means for predicting a passing position of said host vehicle on said road for the moment when said host vehicle and said oncoming vehicle reach each other, whereby said means for predicting a passing position are arranged to base the prediction on said longitudinal velocity of said oncoming vehicle, said longitudinal distance, said longitudinal and lateral velocity of said host vehicle and said future path of said host vehicle;

means for predicting a free passing distance (f) for free passing of said oncoming vehicle on said first side of said host vehicle on said road, whereby said means for predicting a free passing distance (f) are arranged for predicting the free passing distance (f) for the situation when said host vehicle is positioned in said passing position, whereby said free passing distance (f) is the minimum distance between said first side of said host vehicle and a road edge intended to be located on an opposite side of said oncoming vehicle compared to said host vehicle when said vehicles (2, 15) reach each other;

means for estimating a maximum transverse width (w) of said oncoming vehicle;

means for deciding whether a vehicle forward collision threat exists or not, whereby said decision means are arranged to decide that a vehicle forward collision threat exists if said free passing distance (f) is equal to or less than a comparison value, whereby said comparison value is at least equal to said estimated maximum transverse width (w) of said oncoming vehicle, and to decide that no vehicle forward collision threat exists if said free passing distance (f) is greater than said comparison value, and means for signaling to a collision avoidance task execution system, whereby said signaling means are arranged to signal a decision of the existence of a vehicle forward collision threat to said execution system.

8. The system according to claim 7 wherein said means for establishing the presence of an oncoming vehicle comprises at least one of a radar, a lidar, a laser and a camera based sensor.

9. The system according to claim 7 wherein said free passing distance (f) is approximated to be the minimum distance between said first side of said host vehicle and a lane border intended to be located on an opposite side of said oncoming vehicle compared to said host vehicle when said vehicles reach each other.

10. The system according to claim 7 wherein said means for predicting a free passing distance (f) comprises a lane marker sensor.

11. The system according to claim 7 wherein said means for estimating said maximum transverse width (w) of said oncoming vehicle comprises means for estimating a vehicle size class of said oncoming vehicle, whereby said means for estimating said maximum transverse width (w) of said oncoming vehicle are arranged to estimate the maximum transverse width (w) to be a pre-set standard maximum transverse width of vehicles of said estimated vehicle size class of the oncoming vehicle.

12. The system according to claim 7 wherein said means for estimating said maximum transverse width (w) of said oncoming vehicle are arranged to estimate said maximum transverse width (w) to be a pre-set value.

13. A vehicle collision threat system comprising a computer with programmed instructions operable to:

determine a presence of another vehicle in front of a host vehicle, the host vehicle and the other vehicle traveling on a road, the other vehicle being intended to pass the host vehicle on a first side of the host vehicle;

determine a passing position where the host vehicle and the other vehicle will reach each other on the road;

determine a free passing distance for free passing of the other vehicle on the first side of the host vehicle on the road, the free passing distance being determined for a situation when the host vehicle is positioned in the passing position, the free passing distance being the minimum distance between the first side of the host vehicle and a road edge located on an outer side of the other vehicle opposite to an inner side of the other vehicle closest to the first side of the host vehicle when the vehicles reach each other on the road;

determine a transverse width of the other vehicle;

determine a vehicle collision threat exists in the event the free passing distance is equal to or less than a comparison value, the comparison value being at least equal to the transverse width of the other vehicle; and determine no vehicle collision threat exists in the event the free passing distance is greater than the comparison value.

14. The vehicle collision system of claim 13 further operable to determine that the vehicle threat exists or that no vehicle threat exists without determining a travel path of the other vehicle.

15. The vehicle collision system of claim 13 further operable to determine that the vehicle threat exists or that no vehicle threat exists without using lateral velocity and lateral acceleration of the other vehicle.

16. The vehicle collision system of claim 13 further operable to determine that the vehicle threat exists or that no vehicle threat exists when the other vehicle is approaching the host vehicle.

17. The vehicle collision system of claim 13 further operable to determine that the vehicle threat exists or that no vehicle threat exists when the other vehicle is traveling in a same direction as the host vehicle.

18. The vehicle collision system of claim 13 further operable to:

determine a longitudinal velocity of the other vehicle;

determine a longitudinal distance between the host vehicle and the other vehicle;

determine a longitudinal velocity and a lateral velocity of the host vehicle determine a future path of the host vehicle;

determine the passing position based on the longitudinal velocity of the other vehicle, the longitudinal distance, the longitudinal and lateral velocity of the host vehicle and the future path of the host vehicle.

19. The vehicle collision system of claim 13 further operable to determine the free passing distance based on a distance determined by a lane marker sensor on the host vehicle.

20. The vehicle collision system of claim 13 further operable to determine the traverse width of the other vehicle based on a width determined by a front sensor on the host vehicle.

* * * * *